United States Patent
Schmidt et al.

(10) Patent No.: US 8,142,727 B2
(45) Date of Patent: Mar. 27, 2012

(54) VALVELESS REGENERATIVE THERMAL OXIDIZER FOR TREATING CLOSED LOOP DRYER

(75) Inventors: Brian Schmidt, Crystal Lake, IL (US); Bradley Ginger, Arlington Heights, IL (US)

(73) Assignee: Eisenmann Corporation, Crystal Lake, IL (US)

( * ) Notice: Subject to any disclaimer, the term of this patent is extended or adjusted under 35 U.S.C. 154(b) by 684 days.

(21) Appl. No.: 12/331,149

(22) Filed: Dec. 9, 2008

(65) Prior Publication Data
US 2010/0139115 A1    Jun. 10, 2010

(51) Int. Cl.
*B01D 50/00*    (2006.01)
*F26B 7/00*    (2006.01)

(52) U.S. Cl. .............. 422/179; 34/467; 34/469; 95/148; 432/180

(58) Field of Classification Search .................... 95/148; 110/211; 431/181; 34/469, 86, 396, 467; 422/179, 173, 175; 432/180
See application file for complete search history.

(56) References Cited

U.S. PATENT DOCUMENTS

| | | | |
|---|---|---|---|
| 4,813,155 A | 3/1989 | Jensen et al. | |
| 5,357,686 A | 10/1994 | Jensen | |
| 5,950,322 A * | 9/1999 | Knabe | 34/86 |
| 5,966,837 A * | 10/1999 | Backa et al. | 34/469 |
| 6,122,841 A | 9/2000 | Jensen | |
| 6,213,758 B1 * | 4/2001 | Tesar et al. | 431/12 |
| 6,235,249 B1 * | 5/2001 | Fu et al. | 422/173 |
| 6,266,895 B1 | 7/2001 | Jensen | |
| 6,393,727 B1 * | 5/2002 | Seelig et al. | 34/396 |
| 6,438,863 B1 | 8/2002 | Jensen | |
| 6,576,198 B2 | 6/2003 | Cash | |
| 6,651,357 B2 | 11/2003 | Bria et al. | |
| 6,681,497 B2 | 1/2004 | Bria et al. | |
| 7,033,544 B2 | 4/2006 | Tesar et al. | |
| 7,128,880 B2 | 10/2006 | Dahms et al. | |
| 7,160,358 B2 | 1/2007 | Spink et al. | |
| 7,332,136 B2 * | 2/2008 | Heed | 422/179 |
| 7,718,034 B2 * | 5/2010 | Vaders | 162/23 |
| 7,762,808 B2 * | 7/2010 | Lee et al. | 432/180 |
| 7,833,010 B2 * | 11/2010 | Baker et al. | 431/50 |
| 2005/0029373 A1 | 2/2005 | Vaders | |
| 2005/0229780 A1 | 10/2005 | Spink et al. | |
| 2006/0039844 A1 | 2/2006 | Gutson et al. | |
| 2006/0049537 A1 | 3/2006 | Christoffersen | |

OTHER PUBLICATIONS

"Superheated Steam Dryer and Processor," Barr-Rosin, GEA Process Engineering Division, Jun. 2007.
"Superheated Steam Drying," Energy Integration, Barr-Rosin, GEA Process Engineering Division, Jun. 2007.
"New European Drying Technology Helps U.S. Ethanol Producer Beat EPA Emission Limits While Cutting Cost of Process Energy," Dedert Corporation, 2004.
"Closed-steam-loop drying system clears up stack exhaust, cuts fuel costs," CSC Publishing, Powder and Bulk Engineering, Apr. 2006.
"Anhydro Solutions for Bioethanol," Anhydro, 2007.
"Industrial Superheated Steam Drying," TNO Environment, Energy and Process Innovation, Apeldoorn, Netherlands, Jun. 2004.

* cited by examiner

*Primary Examiner* — Nina Bhat
(74) *Attorney, Agent, or Firm* — Brinks Hofer Gilson & Lione

(57) ABSTRACT

A System for reducing organic contaminates from the condensate discharge of a closed loop industrial drying process. The system includes a dryer, a regenerative thermal oxidizer (RTO) in flow communication with the dryer, and an energy recovery unit in flow communication with the RTO.

19 Claims, 2 Drawing Sheets

VALVELESS REGENERATIVE THERMAL OXIDIZER FOR TREATING CLOSED LOOP DRYER

FIELD OF THE INVENTION

This invention pertains to a regenerative thermal oxidizer apparatus and a method for reducing the organic contaminants in the discharge condensate from a closed loop drying system.

BACKGROUND OF THE INVENTION

Known methods for reducing the organic contaminants were predicated upon treating in a liquid state the condensed water that results from the energy recovery step of the closed loop drying system.

The disadvantage of the current state of the art is that the contaminants must be removed while the material is handled in a liquid state. To achieve water quality level suitable for commercial reuse or discharge to sewer often requires multiple physical separation and chemical treatment steps. As a result, the capital cost of the equipment is generally higher in comparison to treating the emissions in a vapor state using a single, highly efficient, thermal step that can be integrated into the closed loop drying system between the dryer and the energy recovery step.

The above described disadvantages impose increased economic requirements in capital investments in water treatment facilities and in the requirements of increased footprint in terms of plant space. Furthermore, the energy utilization in the water treatment cannot be partially recovered as can the thermal treatment of the organics in the regenerative thermal oxidizer prior to the energy recovery step. Different waste water treatment strategies and pre-existing waste water treatment facilities can reduce the closed loop dryer condensate costs on a per gallon basis. For a new installation, however, it is extremely difficult to offset the capital cost disadvantage of water treatment as opposed to the innovation of using an integrated regenerative thermal oxidizer to treat the organics prior to the energy recovery.

DETAILED DESCRIPTION OF THE INVENTION

Figure 1:
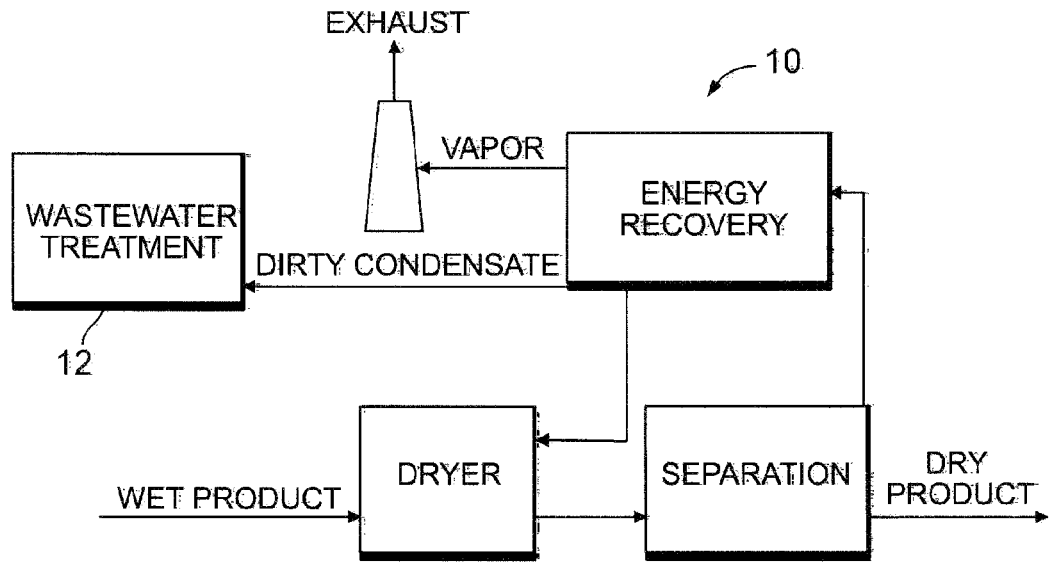
FIG. 1 is a schematic of the current state-of-the-art closed loop drying system that utilizes a separate liquid water treatment step.
Figure 2:
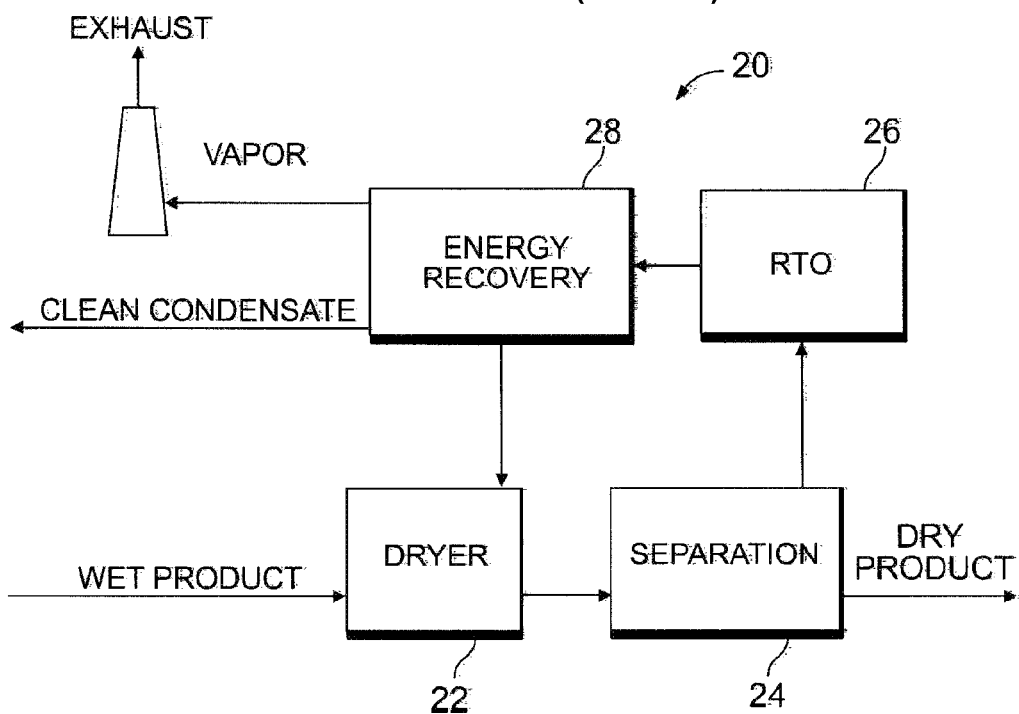
FIG. 2 is a schematic of a system for removing organic pollution emissions by integrating a regenerative thermal oxidizer into a closed loop drying system between the dryer and the energy recovery step.

FIG. 1 shows a known closed loop drying system 10 that utilizes a separate liquid water treatment apparatus 12. The invention involves a system 20, as shown in FIG. 2, for removing organic contaminants resulting from an industrial drying process. The system is comprised of an industrial dryer 22 and separator 24 that emits a contaminated drying medium, a regenerative thermal oxidizer 26 in flow communication with the dryer 22, and an energy recovery unit 28 in flow communication with the oxidizer 26.

The system 20 incorporates in one apparatus all of the functionality needed to treat the organic contaminants resulting from closed loop drying functions. The system 20 uses a regenerative thermal oxidizer 26 such as the one described in U.S. Pat. No. 5,562,442, the contents of which is incorporated herein. The system treats gas phase emissions from the closed loop dryer 22 so that in the subsequent evaporative energy recovery step, the liquid water produced is of a substantially improved quality reducing any subsequent water treatment requirements.

When in operation, the system 20 is used to treat emissions from closed loop dryers 22 designed to dry liquid/solid slurries. Ideally the emissions being treated are in the range of 20,000 to 80,000 SCFM at temperatures between 200 and 260° F. The ideal pressure range is in the area of 10 to 60" w.c. as measured at the inlet to the thermal treatment.

In an embodiment of the invention, the energy recovery unit 28 is a heat exchanger which condenses water out of the air stream. The condensed water is then discharged to an external source while the remaining drying medium is further processed and returned to the dryer.

In an embodiment of the invention, the drying medium is superheated steam. In other embodiments, the drying medium can be air or an inert gas such as nitrogen.

The system will produce optimal results operating at a oxidizer combustion chamber temperature between 1,500 and 1,800° F. with an oxygen content of 4-8% volume. In certain embodiments, an enriched oxygen introduction system may be necessary in some applications to optimally meet desired water quality targets without interfering with upstream dryer operations.

Figure 3:
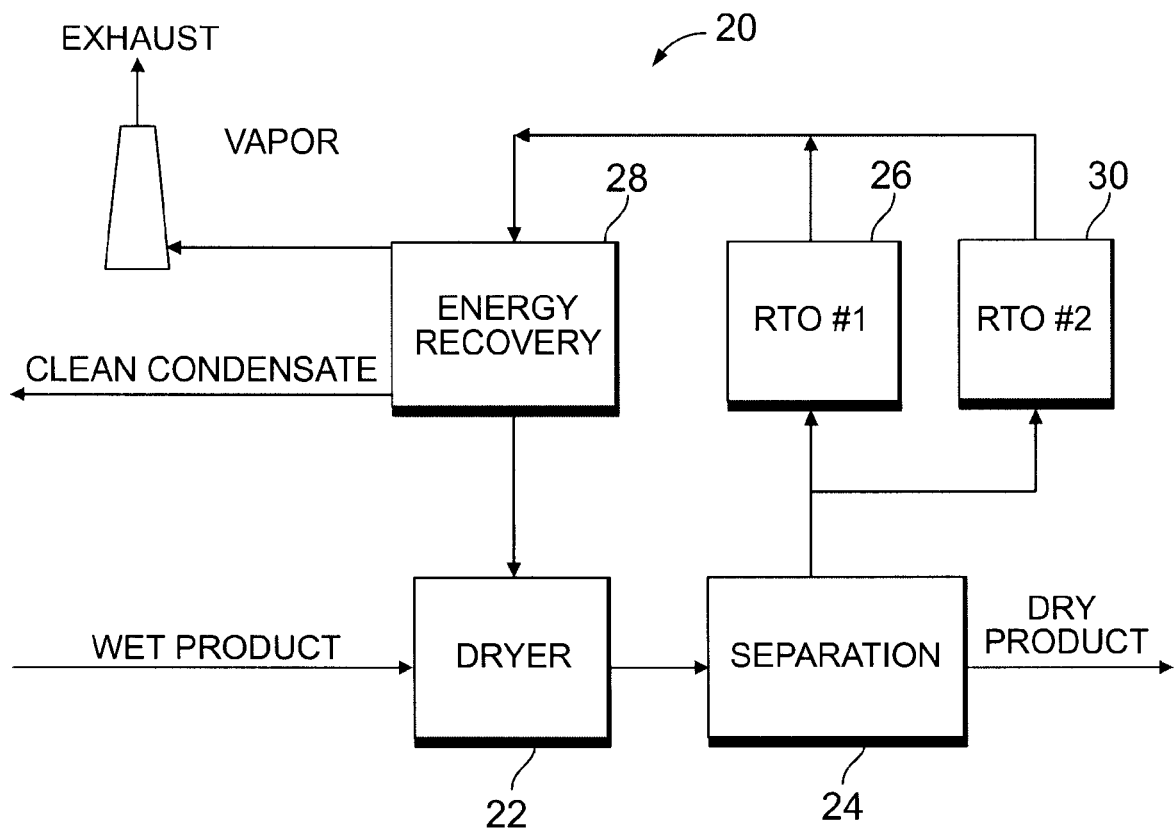
FIG. 3 is a schematic of a second embodiment of a system for removing organic pollution emissions.

The system can operate as a single unitary treatment vessel, or as the same apparatus supplied in duplicate 26, 30 and connected in a parallel piping arrangement, as shown in FIG. 3.

In another embodiment, the system can be supplied with a natural gas injection system as described in U.S. patent application Ser. No. 11/262,135 the content of which is fully incorporated herein.

In another embodiment of the invention, the system can be supplied with a water quality feedback control system. A sensor monitors the quality of the discharge water by measuring, for example, its pH content or conductivity. In still another embodiment, the sensor can adjust the temperature of the regenerative thermal oxidizer when the discharge water exceeds a preset limit.

A method for reducing the organic contaminants from the condensate discharge of a closed loop industrial drying process is also disclosed. The method is comprised of: (1) drawing the drying medium from the drying process through a regenerative thermal oxidizer; (2) reducing the organic contaminants by elevating the temperature of the drying medium in the presence of sufficient oxygen; (3) sending the drying medium through an energy recovery step in which water is condensed and recovered; and (4) returning the drying medium back to the drying process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A system for removing organic contaminants resulting from an industrial process, the system comprised of:
    an industrial dryer that emits a drying medium containing organic contaminants;
    a regenerative thermal oxidizer (RTO) downstream from and in flow communication with the dryer; and
    a heat exchanger downstream from and in flow communication with the RTO,
    wherein the RTO treats emissions from the industrial dryer so that discharge produced from the heat exchanger is of improved quality.

2. The system of claim 1, wherein the heat exchanger condenses water out of the drying medium.

3. The system of claim 1, wherein the condensed water is discharged to an external source.

4. The system of claim 1, wherein the drying medium is cooled by the heat exchanger and returned to the dryer.

5. The system of claim 2, wherein a sensor monitors the quality of the water discharged from the heat exchanger.

6. The system of claim 5, wherein the sensor monitors the conductivity of the discharge water.

7. The system of claim 5, wherein the sensor monitors the pH level of the discharge water.

8. The system of claim 5, wherein the sensor adjust the temperature of the RTO when the discharge water quality exceeds a preset limit.

9. A method for reducing organic contaminates from a condensate discharge of a closed loop industrial drying process, the method comprised of:
    drawing the drying medium from the drying process through a regenerative thermal oxidizer;
    reducing the organic contaminants by elevating the temperature of a drying medium in the presence of sufficient oxygen;
    sending the drying medium through an energy recovery step in which water is condensed and recovered; and
    returning the drying medium back to the drying process.

10. The system of claim 1, wherein the drying medium is selected from the group consisting of superheated steam, air, and an inert gas.

11. The system of claim 1 further comprising a plurality of regenerative thermal oxidizers (RTOs).

12. The system of claim 11, wherein the plurality of regenerative thermal oxidizers (RTOs) are configured in a parallel piping arrangement.

13. The system of claim 1 further comprising a natural gas injection system that supplies the RTO.

14. The system of claim 1 further comprising an enriched oxygen introduction system that supplies the RTO.

15. The system of claim 1, wherein a combustion chamber of the RTO operates at a temperature between 1,500° F. and 1,800° F. with an oxygen content of between 4% and 8% by volume.

16. A method for reducing organic contaminates from a condensate discharge of an industrial drying process, the method comprised of:
    drawing a drying medium from the drying process through a regenerative thermal oxidizer (RTO);
    reducing the organic contaminants by elevating the temperature of a drying medium in the presence of sufficient oxygen; and
    sending the drying medium through a heat exchanger in which water is condensed and recovered.

17. The method of claim 16 further comprising monitoring the quality of the water.

18. The method of claim 16 further comprising adjusting the temperature in the RTO when the water quality exceeds a preset limit.

19. The method of claim 16 further comprising discharging the water to an external source.

* * * * *